United States Patent [19]
> Maehara et al.

[11] Patent Number: 4,670,704
[45] Date of Patent: Jun. 2, 1987

[54] VOLTAGE REGULATOR FOR ALTERNATOR OF VEHICLE

[75] Inventors: Fuyuky Maehara, Kariya; Hidetoshi Kato, Suzuka, both of Japan

[73] Assignee: Nippondenso Co., Ltd., Kariya, Japan

[21] Appl. No.: 872,491

[22] Filed: Jun. 10, 1986

[30] Foreign Application Priority Data

Jun. 12, 1985 [JP] Japan .................................. 60-127440
Apr. 14, 1986 [JP] Japan .................................. 61-85772

[51] Int. Cl.$^4$ .............................................. H02J 7/14
[52] U.S. Cl. .......................................... 322/8; 322/28
[58] Field of Search .................................. 322/7, 8, 28

[56] References Cited

U.S. PATENT DOCUMENTS 4,263,543  4/1981  Watrous et al. ......................... 322/8
4,286,205  8/1981  Watrous .................................. 322/8
4,459,489  7/1984  Kirk et al. ........................... 322/8 X

*Primary Examiner*—R. J. Hickey
*Attorney, Agent, or Firm*—Cushman, Darby & Cushman

[57] ABSTRACT

A voltage regulator maintains an output voltage of an alternator of a vehicle to a voltage in the vicinity of a preset voltage. The voltage regulator has a microcomputer for setting the OFF duty ratio, a switching circuit for switching on or off an electric current flowing through a rotor coil of the alternator and a load sensor for detecting the operation of the intermittent load. The microcomputer sets the OFF duty ratio to a value directly proportional to the difference between the output voltage and the preset voltage before the operation of the intermittent load is started. And the microcomputer gradually decreases the OFF duty ratio set by said duty ratio setting means at the initial operation time of the intermittent load, and memorizes the OFF duty ratio when the output voltage reaches its upper limit value exceeding the preset voltage. The microcomputer changes the OFF duty ratio to an average value of the OFF duty ratio set by the duty ratio setting means and the OFF duty ratio memorized by the memory means when the reoperation of the intermittent load is detected within a prescribed time after the initial operation of the intermittent load.

7 Claims, 13 Drawing Figures

VOLTAGE REGULATOR FOR ALTERNATOR OF VEHICLE

BACKGROUND OF THE INVENTION

1. FIELD OF THE INVENTION

The present invention relates to a voltage regulator for an alternator of a vehicle.

2. DESCRIPTION OF THE PRIOR ART

The voltage regulator of the type described above always maintains an output voltage of the alternator to a preset voltage by increasing or decreasing an electric current flowing through its rotor coil responsive to the variation of the electric load of the alternator. The increase or decrease in electric current is performed by changing the duty ratio of switching means in accordance with the difference between the output voltage and the preset voltage, for example.

When the electric load of the alternator is rapidly increased, the voltage regulator increases the electric current flowing through the rotor coil so as to maintain the output voltage of the alternator constant. This results in an engine which rotates the alternator being overloaded, and particularly at an engine idling time when the rotating torque is small, the number of revolutions of the engine being decreased to incur engine stall.

U.S. Pat. No. 4,459,489 proposes a voltage regulation device by which the electric current flowing through the rotor coil of the alternator is gradually varied to prevent the engine stall when the electric current is rapidly changed.

And recently, an idle speed control (ISC) device has been also employed for temporally increasing the amount of the fuel supply to maintain th number of revolutions of the engine at a constant level when it begins to lower.

However, vehicles provided with the above described voltage regulation device or ISC device have problems that when an intermittent load such as a wiper motor is connected to an alternator, the accompanied periodical variation of the engine load cannot be timely regulated due to the delay time in the control system and accordingly, the number of revolutions of an engine is varied on such a comparatively large scale to generate vibrations. Such vibrations are transmitted to the interior of a vehicle room to worsen the comfartable ride.

SUMMARY OF THE INVENTION

One object of the present invention is to provide a voltage regulator for an alternator of a vehicle which reduces vibrations within a vehicle by restraining the variation of the engine load due to the operation of intermittent loads connected to the alternator.

The voltage regulator of the present invention comprises duty ratio setting means for setting a duty ratio corresponding to the difference between the output voltage and the preset voltage, switching means for switching on and off an electric current flowing through the rotor coil of the alternator in accordance with the duty ratio set by the duty ratio setting means, intermittent load operation detecting means for detecting the operation of the intermittent load, first duty ratio changing means for increasing or decreasing the duty ratio set by the duty ratio setting means by a fixed value at the initial operation time of the intermittent load, memory means for memorizing the duty ratio when the output voltage exceeds the preset voltage and reaches its upper limit value at the initial operation time of the intermittent load and second duty ratio changing means for changing the duty ratio to that determined by the duty ratio set by the duty ratio setting means and the duty ratio memorized by the memory means at least while the intermittent load is operated, upon detecting the reoperation of the intermittent load within a prescribed time after the initial operation of the intermittent load.

When an intermittent load is connected to the alternator and at least while the intermittent load is operated, the duty ratio of the switching means is changed to a fixed duty ratio set by the second duty ratio changing means. This results in the variation of the engine load being restrained and accordingly the transmission of vibrations to the interior of a vehicle being reduced.

Furthermore, since the fixed duty ratio is determined by the duty ratio at the time when the output voltage reaches its upper limit value and that at the time when the intermittent load is not operated, the variation of the output voltage due to the connection of the intermittent load can be also restrained.

BRIEF DESCRIPTION OF THE DRAWINGS

FIG. 1 through 5 illustrate a first embodiment of a voltage regulator according to the present invention:

FIG. 1 is a view illustrating the hardware of the voltage regulator;

FIGS. 2 and 3 are a program flow chart, respectively:

FIG. 6 is a program flow chart: and

FIGS. 7a, 7b and 7c are wave form charts showing the operation of the voltage regulator at the time when an intermittent load is connected thereto, respectively.

DETAILED DESCRIPTION OF THE EMBODIMENTS

Figure 1:
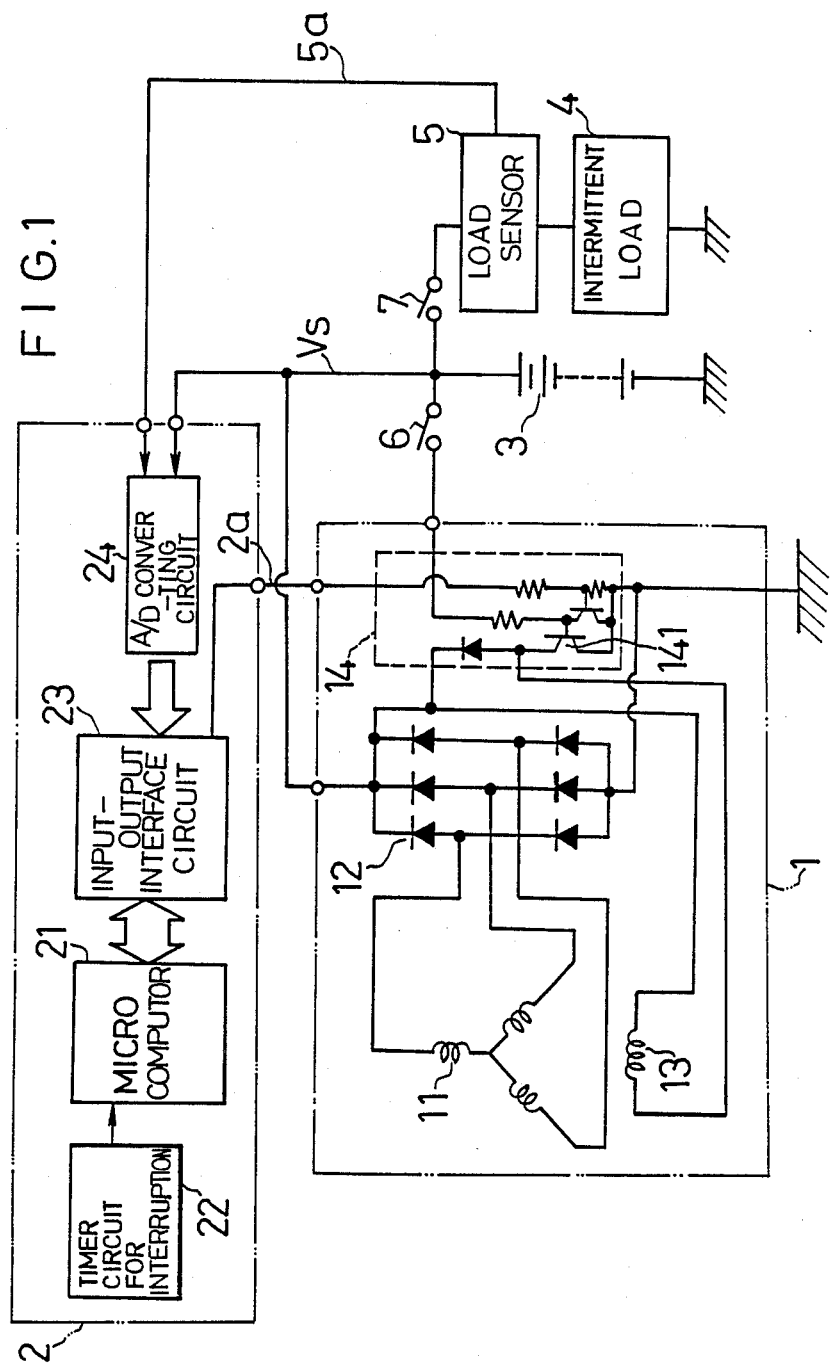

In FIG. 1, an alternator 1 is composed of a stator coil 11, a full-wave rectifier 12 provided on the output side of the stator coil 11, a rotor coil 13 and a swithing circuit 14 for switching an electric current flowing through the rotor coil 13.

The eleotric ourrent flowing through the rotor coil 13 is directly proportional to the ON duty ratio and inversely proportional to the OFF duty ratio of a transistor 141 in the switching circuit 14.

In the stator coil 11 is generated a voltage dependent on the electric current flowing through the rotor coil 13.

The generated voltage is supplied to a battery 3 or a load 4 such as a wiper motor after being rectified by the rectifier 12.

A voltage regulator 2 is composed of a microcomputer 21, a timer circuit 22 for interruption, an input-output interface circuit 23 and an A/D converting circuit 24. To the A/D converting circuit 24 are inputted an output voltage Vs and an output signal 5a from a load sensor 5.

A shunt resistor can be employed as the load sensor 5, for example. In this case, the operation of the load 4 is detected as the rise of the voltage of the output signal 5a.

The microcomputer 21 outputs a pulse signal 2a of a fixed duty ratio through the interface circuit 23. Then, the swithcing circuit 14 is operated upon receiving the pulse signal 2a. Namely, when the pulse signal 2a is 'L' level, the transistor 141 conducts to flow an electric current through the rotor coil 13 when the pulse signal 2a is H level, the transistor 141 does not conducts to stop the electric current from flowing through the rotor coil 13.

A reference numeral 6 designates a key switch and a reference numeral 7 designates a switch for for the intermittent load 4.

Hereinafter, the operation of the voltage regulator will be explained in accordance with the program flow charts of FIGS. 2 and 3.

Figure 2:
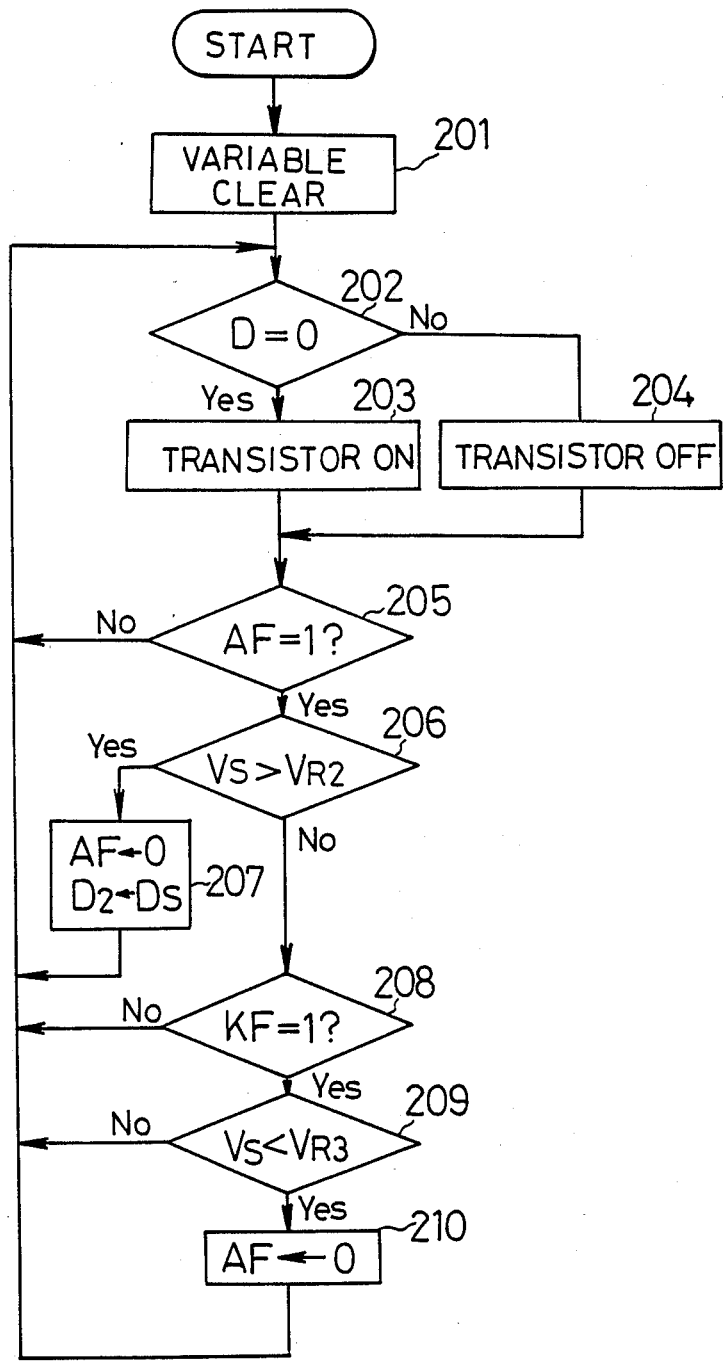
Figure 3:
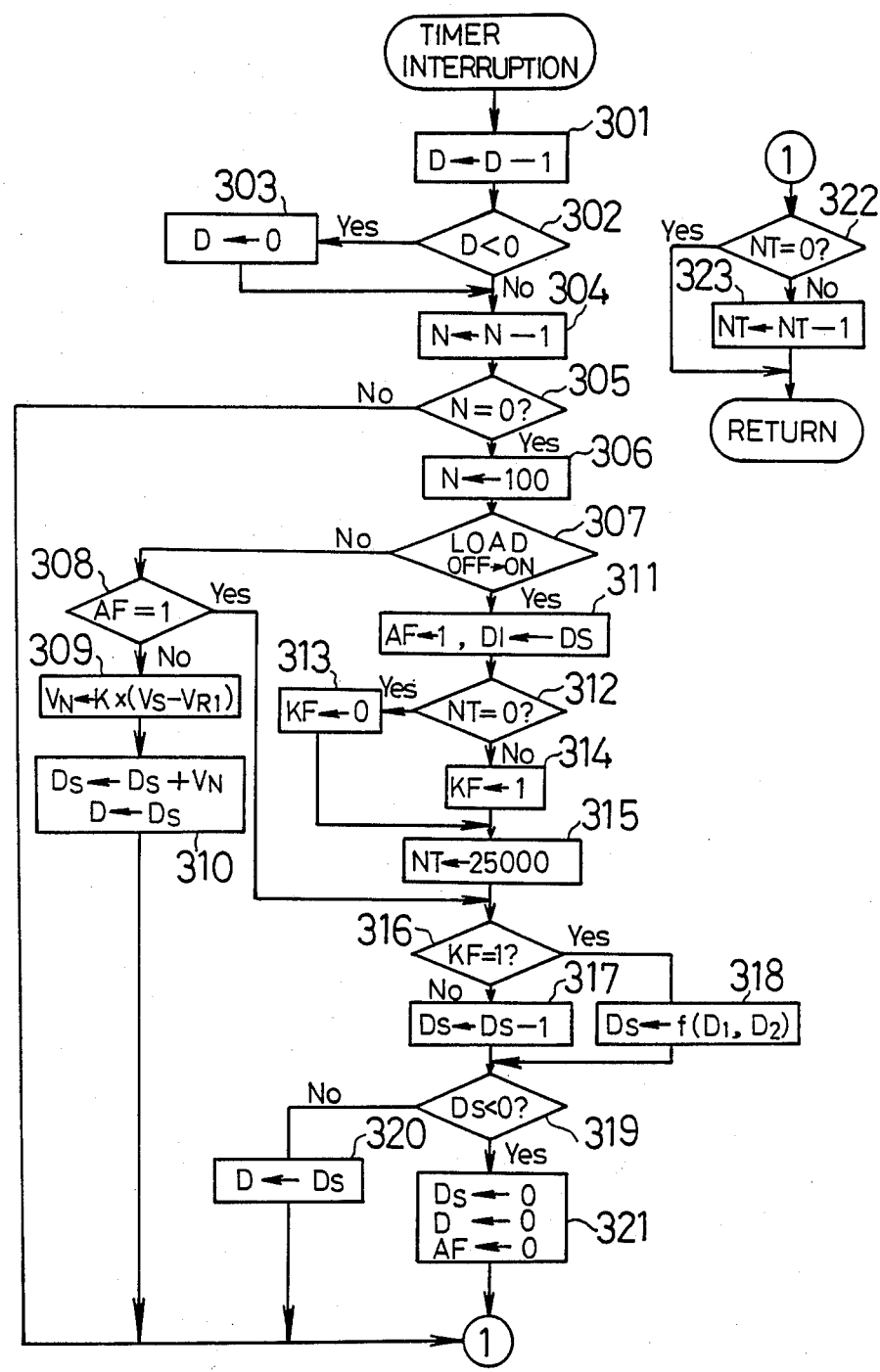

FIG. 2 shows a main program and FIG. 3 shows an interruption program executed every 0.2 ms.

In the drawings, a reference character D designates an OFF duty counter. As shown in Steps 202, 203 and 204 of FIG. 2, when the counter D is not 0, the pulse signal 2a turns H level and the transistor 141 turns OFF.

A reference character N designates a first period counter. As shown in Step 304 of FIG. 3, the first period counter N is count down by every 0.2 ms execution of the program. And the steps beginning from Step 306 are executed every 20 ms after the completion of the count-down of the counter D.

A reference character NT designates a second period counter. This second period counter is count down in Step 323.

In Steps 312, 313, and 314, an intermittent control flag KF is controlled in accordance with the content of the counter NT.

When the operation of the voltage regulator is started, the counters D and NT and flags are cleared in Step 201. The counter N is set to N=100.

In Steps 202 through 205, the transistor 141 is ON-OFF controlled in accordance with the content of the counter D as described above.

In Step 205, an alterflag AF is discriminated. When AF is 1, the discrimination if the output voltage Vs exceeds its upper limit value $V_{R2}$ is executed in Step 206. When the output voltage $V_s$ exceeds the upper limit value $V_{R2}$, the alterflag Af is cleared and the content of an OFF duty memory DS is stored in a memory $D_2$ in Step 207.

In next Step 208, an intermittent control flag KF is discriminated. When KF is 1 and the output voltage Vs is smaller than its lower limit value $V_{R3}$, the alterflag AF is cleared in Steps 209 and 210.

In the timer interruption routine shown in FIG. 3, the OFF duty counter D is count down in Step 301. In the case of D<0, the OFF duty counter D is set to 0 in Steps 302, and 303. And the starting of the load 4 is discriminated every 20 ms based on the signal 5a (FIG. 1) in Steps 304 through 307.

When the load 4 is not starting and the flag AF is not 1(AF≠1 directly after the execution of this program), Steps 309 and 310 are executed. In Step 309, a value $V_N$ which is directly proportional to the difference between the output voltage $V_s$ and the preset voltage $V_{R1}$(K is a constant) is calculated and in Step 310, the content of the memory DS added to the value $V_N$ is stored in the memory DS, and at the same time, the content stored in the memory DS is set in the counter D.

By repeating the above described steps, the content of the OFF duty counter D is renewed every 20 ms. The renewed counter D is count down every 0.2 ms. in Step 301.

While the counter D is count down in the period of 20 ms(namely, D is not 0), the transistor 141 maintains OFF in Step 204. And after the count-down of the counter D is completed, the transistor 141 turns ON.

Thus, the transistor 141 is ON-OFF controlled in the duty ratio dependent on the difference between the output voltage $V_s$ and the preset voltage $V_{R1}$. And accordingly, the voltage $V_s$ is maintained to a constant voltage $V_{R1}$ as shown in the time W of FIG. 4a.

When the load 4 starts, it is detected in Step 307. Then, the alterflag Af is set to 1 and the content of the memory DS(OFF duty ratio directly before the starting of the load 4) is stored in the memory $D_1$. In this case, the period counter NT is 0 and the intermittent control flag KF is not 0. Therefore, Step 317 is executed and the content of the memory DS is count down. And this count-down content is stored in the OFF duty counter D (Steps 319 and 320).

Thereafter, Step 317 is repeatedly executed every 20 ms and the content of the memory DS is count down. This results in the OFF duty ratio of the transistor 141 being decreased by a fixed value (accordingly, the ON duty ratio is inreased).

Figure 4A:
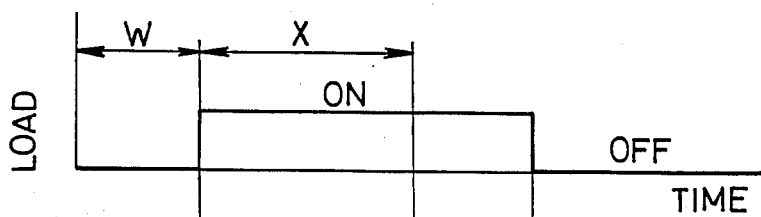
FIGS. 4a, 4b, 4c are wave form charts showing the operation of the voltage regulator when a normal load is connected thereto, respectively.
Figure 4B:
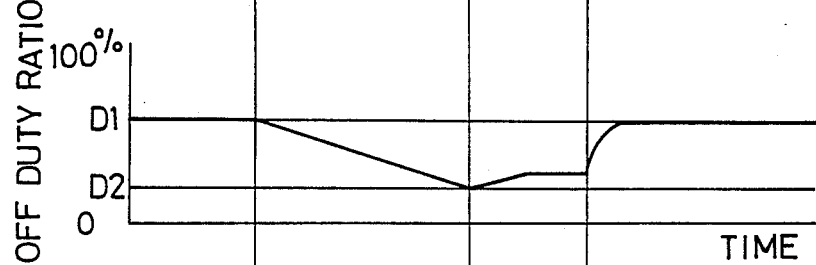
Figure 4C:
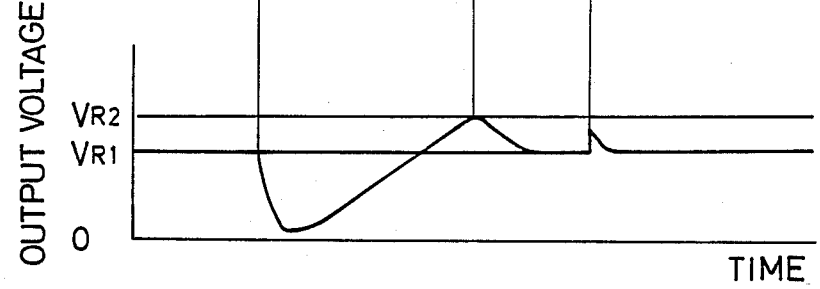

Consequently, the amount of the generated electric power of the alternator 1 increases, and the output voltage Vs temporally dropped due to the starting of the load 4 begins to rise as shown in the time X of FIG. 4a. At this time, ISC device increases the amount of fuel supplied to the engine in order to prevent the undesirable drop in number of revolutions of engine.

After the completion of the count-down of the memory DS, the memory DS, the counter D and the alterflag AF are cleared in Step 321.

Meanwhile, when the output voltage $V_s$ exceeds its upper limit value $V_{R2}$ before the completion of the count-down of the memory DS, the flag AF is cleared in Step 207 and at this time, the content of the memory DS is stored in the memory $D_2$.

When the operation of the load 4 is stopped, the OFF duty ratio of the transistor 141 rises again and returns to the duty ratio in the time W. Then, ISC device decreases the amount of fuel supply.

In the case that the load 4 is an intermittent load which restarts before a fixed time T(which is set by the counter NT to 5 sec in this embodiment) elapses from the first starting time thereof, the counter NI has not finished its count-down operation at the restarting time of the load 4.

In this case, Step 314 is executed and intermittent control flag KF is set to 1. Then, Step 318 is executed. The content of the memory DS is modified to the value $f(D_1, D_2)$ determined by the content of the memories $D_1$ and $D_2$ that is the OFF duty ratio in the unoperated state of the load 4 and the OFF duty ratio in the state where the output voltage $V_s$ exceeds its upper limit value $V_{R2}$. An average value can be used as this value f.

Figure 5A:
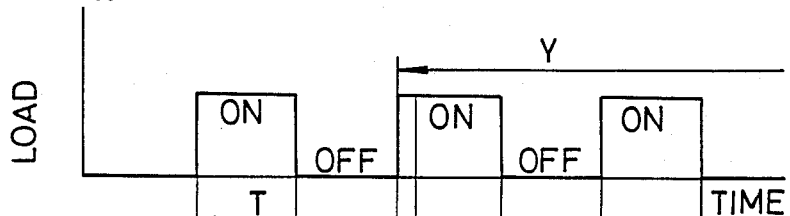
FIGS. 5a, 5b, 5c are wave form charts showing the operation of the voltage regulator when an intermittent load is connected thereto, respectively.
Figure 5B:
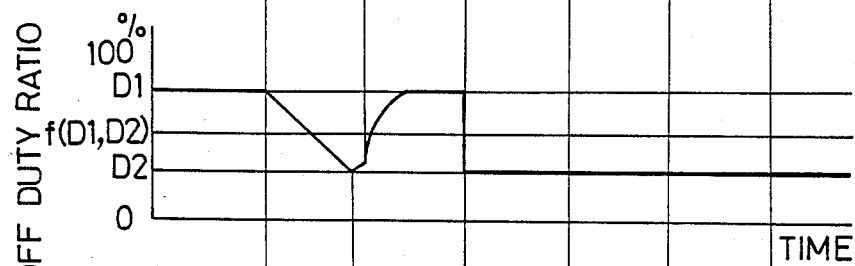

Thereafter, the transistor 141 is controlled to the intermittent load 4 in a constant OFF duty ratio $f(D_1, D_2)$ as shown in the time Y of FIG. 5a.

By cancelling the variation of loads of an engine, the variation in the number of revolutions of the engine due to the duty of the ISC control can be completely prevented and the vibrations of a vehcile body in the idling condition of the engine can be also prevented.

Figure 5C:
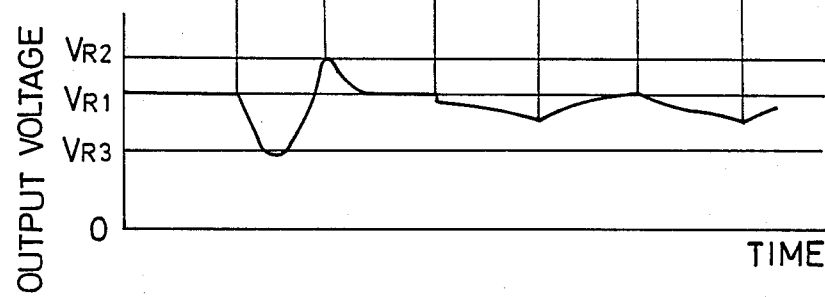

In this case, since the duty ratio of the transistor 141 is set constant, the output voltage $V_s$ varies in a predetermined range dependent on the intermittent operation of the load 4 as shown in FIG. 5c. This variation of the output voltage $V_s$ is not so large since the above described duty ratio is determined as an average value of the content of the memories $D_1$ and $D_2$, for example.

When the output voltage $V_s$ exceeds its upper limit value $V_{R2}$ or lower limit value $V_{R3}$ due to the variation of another electric load while one intermittent load is controlled, the flag AF is cleared in Step 207 or 210 and then the output voltage $V_s$ is temporally returned to the constant voltage $V_{R1}$.

In the above described embodiment, the voltage regulator is applied to a vehicle provided with the ISC device. In addition, the voltage regulator of the present invention can be also applied to a vehicle provided with no ISC device. In this case, the engine of the vehicle must be always set to the idle-up state while the intermittent load is controlled.

In the above described embodiment, the OFF duty ratio is made constant to completely cancel the variation of the engine load while the intermittent load is controlled (the time Y of FIG. 5a).

At this time, the output voltage $V_s$ is not regulated so as to vary in accordance with the intermittent operation of the load.

When the operation interval of the load is comparatively small, the variation of the output voltage can be restrained as shown in the above embodiment, but when the operation interval of the load is long(non-operation time is long), the output voltage tends to excessively rise to shorten the lifetime of various electric parts on a vehicle.

In order to overcome the above problems, according to another embodiment, the OFF duty ratio is not made constant but controlled so that the output voltage $V_s$ approaches the preset voltage $V_{R1}$ when the intermittent load is not operated.

Figure 6:
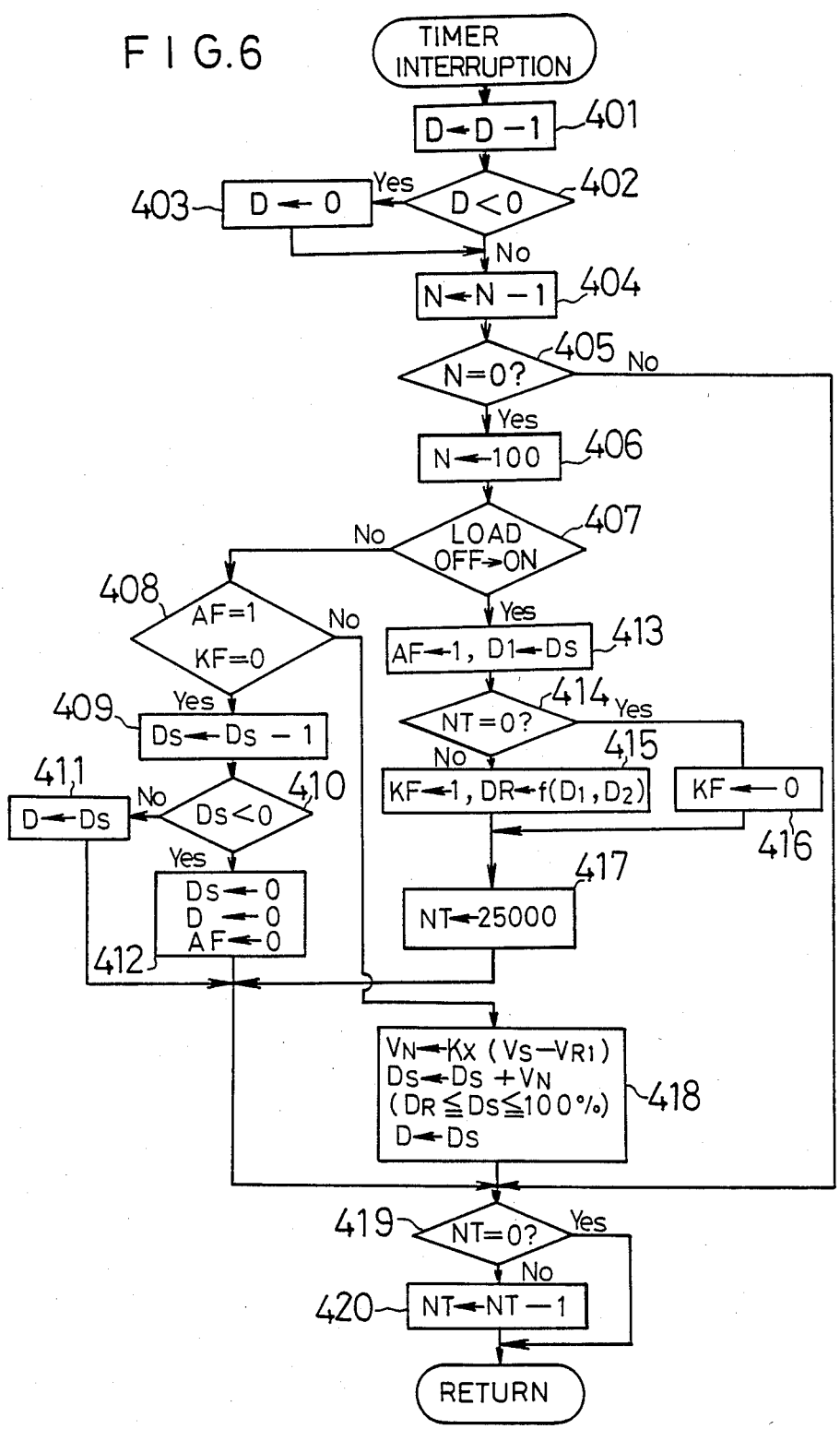
FIGS. 6, 7a, 7b, and 7c illustrate a second emobidment of the voltage regulator according to the present invention.

FIG. 6 is a timer interruption program of which the main program is equal to that of FIG. 2. Steps 401 to 407 in FIG. 6 are equal to Steps 301 to 307 in FIG. 3, respectively.

At a first operation time of the intermittent load, an alterflag AF is set and the content of the OFF duty memory DS is stored in the memory D1(Steps 407, 413). Since the period counter NT is 0, the intermittent flag KF is cleared (Steps 414, 416). Then, Steps 417, 419 and 420 are executed.

Steps 408 to 412 are repeated every 20 ms to count down the OFF duty counter D.

And the content of the OFF duty memory DS at the time when the output voltage $V_s$ exceeds its upper limit value $V_{R2}$. is stored in the memory $D_2$ and the flag AF is reset (Step 207 of FIG. 2).

When the intermittent load begins its next operation within a prescribed time of five seconds, the intermittent flag KF is set and the value $f(D_1, D_2)$ determiend by the content of the memories $D_1$ and $D_2$ is stored in the lower limit value memory $D_R$ (Step 415) since the counter NT is not 0 in Step 414.

Thereafter, Steps 408 and 418 are executed except when the intermittent load begins its operation. In Step 418, the value $V_N$ which is directly proportional to the difference between the output voltage $V_s$ and the preset voltage $V_{R1}$ is calculated and the content of the memory DS added to the value $V_N$ is stored in the memory DS. The lower limit value of the content of the memory DS is determined by the content of the lower limit value memory $D_R$, that is $f(D_1, D_2)$. The content of the memory DS is stored in the counter D.

Figure 7A:
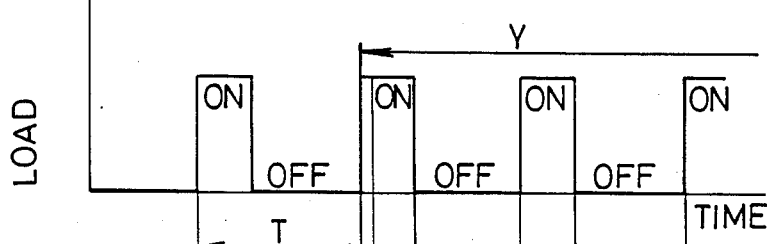
Figure 7B:
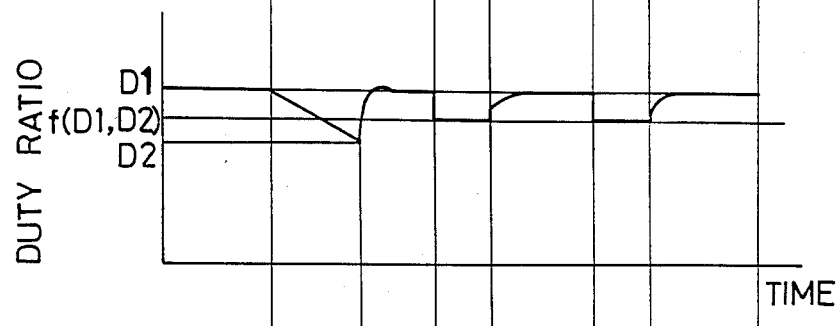
Figure 7C:
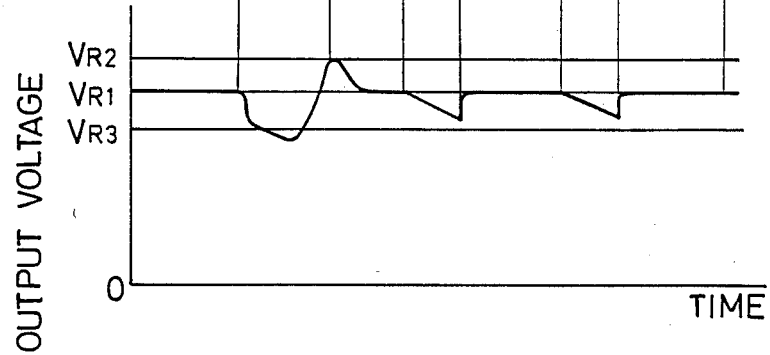

When the intermittent load is operated in the control mode of the intermittent load(in the time Y of FIG. 7a), the OFF duty ratio is lowered but its lower limit value is limited by the value $f(D_1, D_2)$.

When the intermittent load is not operated, the OFF duty ratio is changed so that the output voltage $V_s$ is made equal to the preset voltage $V_{R1}$.

According to the present invention, the OFF duty ratio is changed but its variation range is comparatively small since its lower limit value is limited and accordingly, the variation of the load of an engine can be restrained. This results in the excessive rise of the output voltage to the intermittent load of a comparatively long operation period being avoidable.

According to this embodiment, the lower limit value $f(D_1, D_2)$ of the OFF duty ratio is calculated from the just preceding OFF duty ratio D every time the intermittent load begins its operation. Therefore, the proper lower limit value $f(D_1, D_2)$ can be selected independently of the operation of other electric loads.

What is claimed is:

1. A voltage regulator for maintaining an output voltage of an alternator of a vehicle, which is provided with a rotor coil and to which an intermittent load is connected, to a preset voltage, comprising:
    duty ratio setting means for setting a duty ratio corresponding to the difference between the output voltage and the preset voltage;
    switching means for switching on and off an electric current flowing through the rotor coil of the alternator in accordanoe with the duty ratio set by said duty ratio setting means;
    intermittent load operation detecting means for detecting the operation of the intermittent load;
    first duty ratio changing means for increasing or decreasing the duty ratio set by the duty ratio setting means by a fixed value at the initial operation time of the intermittent load;
    memory means for memorizing the duty ratio when the output voltage exceeds the preset voltage and reaches its upper limit value at the initial operation time of the intermittent load; and
    second duty ratio changing means for changing the duty ratio to that determined by the duty ratio set by said duty ratio setting means and the duty ratio memorized by said memory means at least while the intermittent load is operated, upon detecting the reoperation of the intermittent load within a prescribed time after the initial operation of the intermittent load.

2. A voltage regulator according to claim 1, wherein said second duty ratio changing means also maintains said changed duty ratio during the non-operation of the intermittent load.

3. A voltage regulator according to claim 2, wherein said second duty ratio changing means allows said duty ratio setting means to set the duty ratio when the output voltage reaches said upper limit value or its lower limit value below the preset voltage after the reoperation of the intermittent load.

4. A voltage regulator according to claim 1, wherein said second duty ratio changing means allows said duty ratio setting means to set the duty ratio during the non-operation of the intermittent load.

5. A voltage regulator according to claim 4, wherein said second duty ratio changing means allows said duty ratio setting means to set the duty ratio when the output voltage reaches said upper limit value or its lower limit value below the preset voltage.

6. A voltage regulator according to claim 1, wherein said second duty ratio changing means employs an average value of the duty ratio set by said duty ratio setting means and the duty ratio memorized by said memory means as the duty ratio determined by the duty ratio set by said duty ratio setting means and the duty ratio memorized by said memory means.

7. A voltage regulator according to claim 1, wherein said intermittent load operation detecting means has a shunt resistor connected in series to the intermittent load and detects the operation of the intermittent load from the rise of a voltage appearing at both ends of said shunt resistor.

* * * * *